Figure 1:
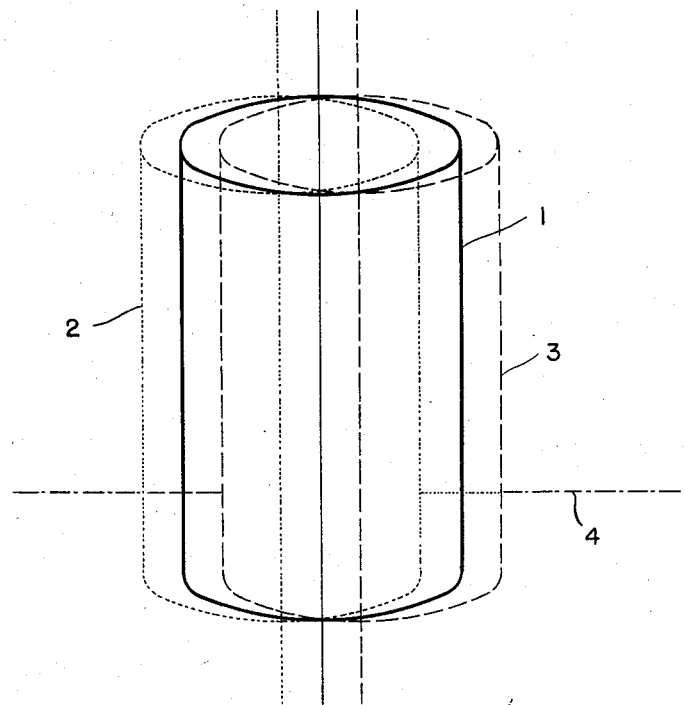

Sept. 15, 1959     S. STIMSON     2,903,801
METHOD OF PRODUCING THREE-DIMENSIONALLY APPEARING DRAWINGS
Filed July 23, 1953

*INVENTOR.*
SAMUEL STIMSON
BY
ATTORNEY

United States Patent Office 2,903,801
Patented Sept. 15, 1959

2,903,801

METHOD OF PRODUCING THREE-DIMENSIONALLY APPEARING DRAWINGS

Samuel Stimson, New York, N.Y.

Application July 23, 1953, Serial No. 369,932

3 Claims. (Cl. 35—26)

The present invention relates to a method of producing in a two-dimensional plane drawings which create a three-dimensional illusion when viewed through appropriate filters or screens.

There are already known several methods of producing three-dimensionally appearing drawings. These methods as hitherto known, generally employ two two-dimensional displacements of a representation of the object intended to appear three-dimensional when viewed through filters or screens. The displacements are produced in complementary or distinctly different colors, usually red and blue, or color hues containing these colors. When the left hand displacement is reddish and the right hand displacement bluish and the displacements are viewed through similarly colored screens or filters with the bluish filter in front of the right eye and the reddish filter in front of the left eye of the observer, the reddish filter cancels out the red displacement and the bluish filter the blue displacement. The result is a black or gray and white three-dimensionally appearing composite image.

The disadvantage of this and similar methods is that the image does not appear to be life-like and rounded but flat and as if the objects shown by the representation were arranged in planes differently spaced in depth. This flat appearance of the image is primarily due to the fact that displacements of the representation are used while in actuality the eyes see two different views of an object.

It is further known to create a three-dimensional or stereoscopic illusion by simultaneously taking two photographs of an object with a stereoscopic camera known for such purpose. The two photographs thus obtained show correctly the object as seen by the left eye and by the right eye respectively and when viewed in reversed position through suitable lenses are composed to create a three-dimensionally appearing image of the object. While this photographic method produces life-like and rounded images of the object it has several inherent limitations. It is not always practical to take pictures of an object and it is expensive. In particular, the photographic method is unsuitable when it is desired to produce rapidly and inexpensively three-dimensionally appearing representations of an object for purposes of advertising, entertainment or education. The photographic method is particularly unsuitable when it is desired to produce a sequence of many slightly different pictures as are required for instance for cartoons, comic strips or animated films showing drawn pictures.

One of the objects of the present invention is to provide a novel and improved method of rapidly and inexpensively producing representations of objects in form of drawings which when viewed through an appropriate filter or screen create a strongly and truly life-like three-dimensional illusion.

Another object of the invention is to provide a novel and improved method of producing three-dimensionally appearing drawings which can be easily drawn by applying simple and definite rules.

Still another object of the invention is to provide a novel and improved method which permits to control and vary the three-dimensional effect of the drawings by again applying simple and definite rules.

The aforesaid objects, features and advantages and further objects, features and advantages of the invention are attained by applying the following coacting steps:

(1) Preparing a drawn representation of the object in the position desired for the three-dimensionally appearing image of the representation, the said representation constituting a reference or key drawing.

(2) Preparing a drawn representation of the object as seen by the left eye of the draftsman in a position displaced to the right of the reference drawing.

(3) Preparing a drawn representation of the object as seen by the right eye of the draftsman in a position displaced to the left of the reference drawing.

When these displacements are drawn with complementary colors such as blue for the right displacement and red for the left displacement and viewed through correspondingly colored filters or screens, the blue filter in front of the right eye and the red filter in front of the other eye of the observer, the composite image will appear in the position of the reference drawing. By reason of the fact that in contrast to the methods as hitherto used for producing three-dimensionally appearing images of drawings, the method of the invention does not use simple physical displacements of a single drawing of the objects but displacements showing true left and right eye views of the object, the composite image creates a well-rounded and strong three-dimensional illusion, both in depth and forward relative to the physical plane of the displacements.

The term "drawing" as herein used refers of course only to the original created by the draftsman. This original may be reproduced by any method suitable and known for the purpose. The term "drawing" when applied to the original should be construed in a broad sense, that is, it is intended to include a preparation of the original reference or key drawing and the displacements thereof by methods such as etching etc.

The method according to the invention will be more fully explained in connection with the accompanying drawing showing several embodiments of the invention by way of illustration and not by way of limitation.

Figure 2:
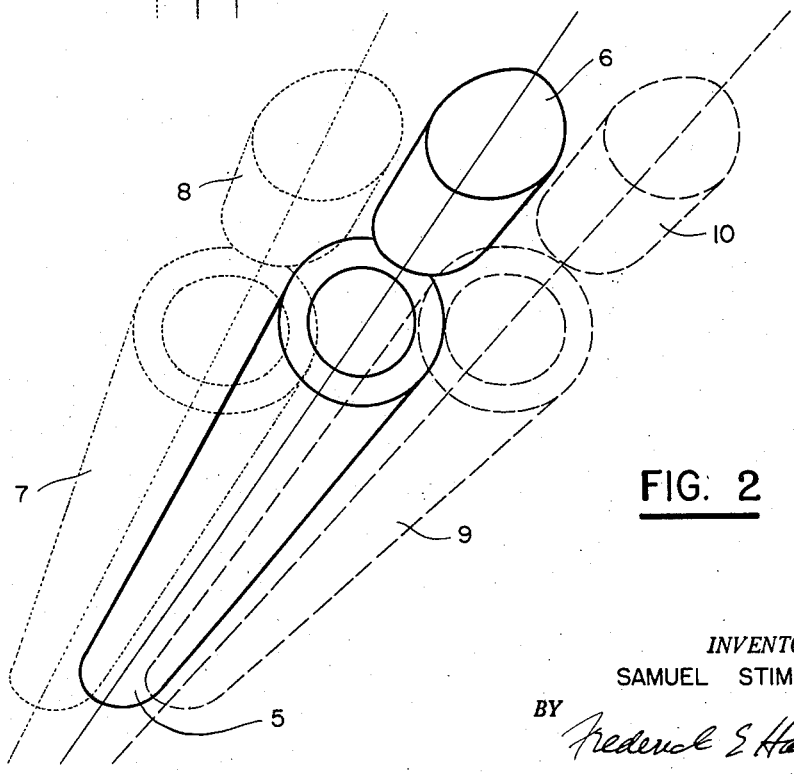

In the drawing:

Fig. 1 is an outline drawing of a cylinder and the associated drawings required for creating a three-dimensionally appearing image of the cylinder, and Fig. 2 is an outline drawing of a gun barrel and of a projectile fired therefrom and of the required associated drawings.

Referring first to Fig. 1 in detail, this figure shows the three respective outline drawings of an upright cylinder laterally displaced relative to each other. The drawing 1 of the cylinder shown in full lines is a representation of the cylinder constituting the reference or key drawing. This drawing is placed in the position in which it is intended that the three-dimensional composite image of the cylinder shall be formed. This reference drawing may be produced by any suitable means and may have any color. It does not optically participate in the formation of the three-dimensional image and is preferably removed after the completion of the displaced drawings. These drawings are shown as a drawing 2 to the left of the reference drawing and as a drawing 3 to the right of the reference drawing. The left hand drawing is not merely a lateral displacement of the reference drawing but shows the cylinder as seen by the right eye of an observer when the observer looks with both eyes straight at the reference drawing at an angle perpendicular to the plane of the paper. Similarly, the right hand drawing is not a simple displacement of the reference drawing but shows the cylinder as seen by the left eye of the observer.

As mentioned before, the two displaced drawings 2 and 3 must be drawn with complementary colors. This is indicated in the figure by using dotted lines for drawing 2 to symbolize a reddish color and for drawing 3 by using dashed lines to symbolize a bluish color. The aforesaid distribution of colors is designed for coaction with a bluish filter in front of the right eye of the observer and a reddish filter in front of the left eye of the observer. To obtain best results, it is desirable that the colors of drawings 2 and 3 match the colors of the filters as closely as possible. The filters are preferably fitted in a spectacle frame. Very inexpensive paper frames are well known for this purpose.

The optical laws by which the filters obliterate the respective colors of the two drawings 2 and 3 are well understood and also that the eyes of the observer when focused upon the position occupied or initially occupied by the reference drawing 1 receives the illusion of a three-dimensional image of the cylinder in the said position. Due to the use of true left eye and right eye views of the reference drawing, the image will be a very natural and life-like three-dimensionally appearing representation of the cylinder, that is, the image will appear to extend beyond the physical plane of the paper and also stand out.

As is well known, the eyes of the observer are only capable of composing the drawings 2 and 3 in lateral direction but not in vertical direction. A horizontal line 4 has been shown to indicate the attitude of colored lines extending in horizontal direction. The line sections outside the figure are shown as a dash-dotted line to indicate a superimposition of the colors blue and red. It will be noted that the red color of the line is obliterated when the line penetrates the left hand red line of drawing 2. Similarly, the blue color is obliterated when the line penetrates the right hand line of drawing 3.

The lateral spacing of the drawings 2 and 3 relative to the reference drawing 1 is not a fixed distance but I have found that the extent of the spacing determines the degree of the created three-dimensional illusion of the image, or more specifically the wider the lateral spacing is the stronger becomes the three-dimensional effect. There is of course a practical limit set by the ability of the eyes to compose the spaced drawings 2 and 3. Beyond a certain spacing which depends to a certain extent upon trial and error and also upon the eyes of the observer, the eyes are no longer capable of contracting the drawings 2 and 3. It will now be apparent that by selecting the lateral spacing, the draftsman is in a position to vary the three-dimensional effect and to obtain an effect which is best suitable for his purpose.

While the original drawings will have to be prepared by a draftsman, it is of course possible to reproduce the original drawings by any reproduction methods known and suitable for the purpose. It will also be apparent that the method of the invention permits to produce three-dimensionally appearing cartoons, drawings etc. in a rapid and simple manner.

Fig. 2 shows an embodiment of the invention similar in principle to the embodiment of Fig. 1. There is shown as reference or key outline drawing a slanted gun barrel 5 and a projectile 6 which has just left the barrel. The reference drawing is again shown in full lines and in the position in which it is intended that the three-dimensional image should appear. The outline drawing 7 of the barrel and the outline drawing 8 of the projectile to the left of the key drawing show the right eye view of the reference drawing as seen when the draftsman looks straight at the reference drawing. Similarly, the outline drawing 9 of the barrel and the outline drawing 10 of the projectile show the view as seen by the left eye of the draftsman. The lines of the displaced drawings again indicate the coloring of these drawings.

It will be observed that the center axes of the three drawings are not parallel to each other but at an angle. This angle reflects the actual images as seen by the eyes of the draftsman.

The three-dimensional effect obtained by the showing of Fig. 2 will be apparent from the description of Fig. 1. It will also be obvious from this description that the reference drawing does not participate in the formation of the composite picture and may be obliterated after the preparation of the displacements.

To simplify the illustration, representations of very simple objects are shown but it will be apparent that the principles of the invention may be equally applied to representations of objects involving more lines and lines that cross each other.

It is sometimes desirable to produce three dimensional appearing images upon a very dark background such as a black background. In such case the colors as previously described are reversed. That is, the right displacement showing the object as seen by the left eye of the observer is shown in red and the left hand displacement showing the object as seen by the right eye of the observer is shown in blue. The same result can be obtained by reversing the filters, that is by placing the blue filter in front of the left eye and the red filter in front of the right eye. The purpose of this reversal is that each filter in front of an eye now views its own color for the purpose of strengthening the respective colors on the black background.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. The method of producing a drawn representation of an object viewable in the form of a three-dimensionally appearing image, said method comprising the steps of first providing a two-dimensional key drawing of the object in the position selected as the apparent position of the three-dimensionally appearing single image of the representation, then preparing a first drawing displaced relative to one side of the lines of the key drawing by duplicating the lines of the key drawing at varying distances in reference thereto selected in accordance with the desired three-dimensional effect, and then preparing a second drawing in the form of a mirror drawing of the first drawing displaced relative to the opposite side of the lines of the key drawing so that each point of the second drawing is substantially equally located in reference to the respective point of the key drawing as the corresponding point of the first drawing.

2. The method according to Claim 1 and further comprising the step of deleting the key drawing after completion of the second drawing.

3. The method according to Claim 1 wherein the first drawing is displaced to the left of the key drawing and drawn with a reddish color and the second drawing is displaced to the right of the key drawing and drawn with a bluish color for observation of the first and second drawing through a bluish filter in front of the right eye and a reddish filter in the front of the left eye of an observer.

References Cited in the file of this patent

UNITED STATES PATENTS

| | | |
|---|---|---|
| 1,386,720 | Macy | Aug. 9, 1921 |
| 1,614,748 | Macy | Jan. 18, 1927 |
| 2,386,418 | Armbrust | Oct. 9, 1945 |
| 2,560,658 | Pareto | July 17, 1951 |
| 2,587,585 | Ayers | Mar. 4, 1952 |